Feb. 7, 1928.　　　　　　　　　　　　　　　　1,658,398
W. SEAMAN
GRADING AND DIRT TRANSFERRING APPARATUS
Filed Nov. 11, 1925　　　　2 Sheets-Sheet 1
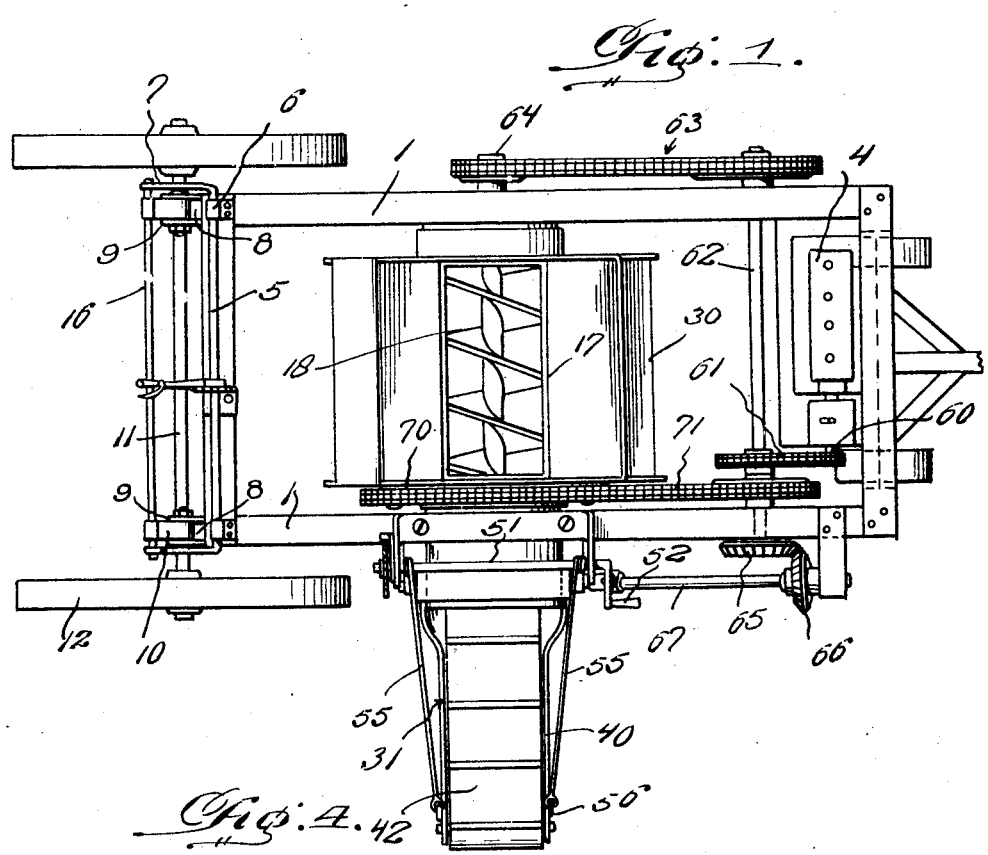
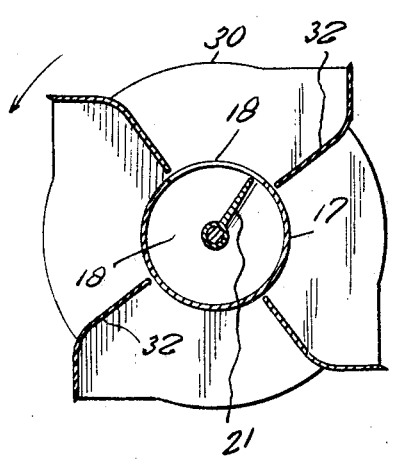
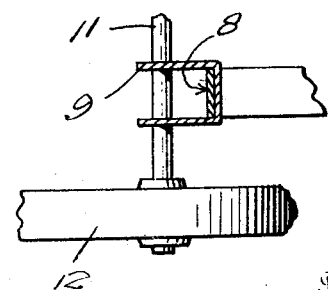
Inventor
W. Seaman,
By Clarence A. O'Brien.
Attorney Feb. 7, 1928.

W. SEAMAN 1,658,398

GRADING AND DIRT TRANSFERRING APPARATUS

Filed Nov. 11, 1925    2 Sheets-Sheet 2

Inventor
W. Seaman,

By Clarence A. O'Brien
Attorney

Patented Feb. 7, 1928.                                            1,658,398

UNITED STATES PATENT OFFICE.

WALTER SEAMAN, OF AUBURN, WASHINGTON.

GRADING AND DIRT-TRANSFERRING APPARATUS.

Application filed November 11, 1925. Serial No. 68,340.

My present invention pertains to apparatus for operating on roads and other places for the grading thereof; and it has for its general object the provision of an apparatus designed more especially for the grading and building of roads, the apparatus being characterized by the capacity to lift dirt from a road in such a manner as to leave a smooth and level surface, and to transfer the dirt so lifted to a point at one side of the apparatus or to a wagon positioned alongside the apparatus and intended to haul the dirt away.

The apparatus is susceptible of adjustment to assure operation of all of its parts to the best advantage, and with the foregoing object in mind the invention in all of its details will be fully understood from the following description and claims when the same are read in connection with the drawings, accompanying and forming part of this specification, in which:—

Figure 1 is a top plan view of the apparatus which in all essential features constitutes the best practical embodiment of my invention of which I am cognizant.

Figure 4 is a fragmentary longitudinal section taken through a portion of the rotary lifter of my improvement, and showing scoops comprised in said rotary lifter.

Figure 5 is an enlarged fragmentary view illustrating a feature of my improvement hereinafter explicitly alluded to.

Similar numerals of reference designate corresponding parts in all of the views of the drawing.

Figure 2:
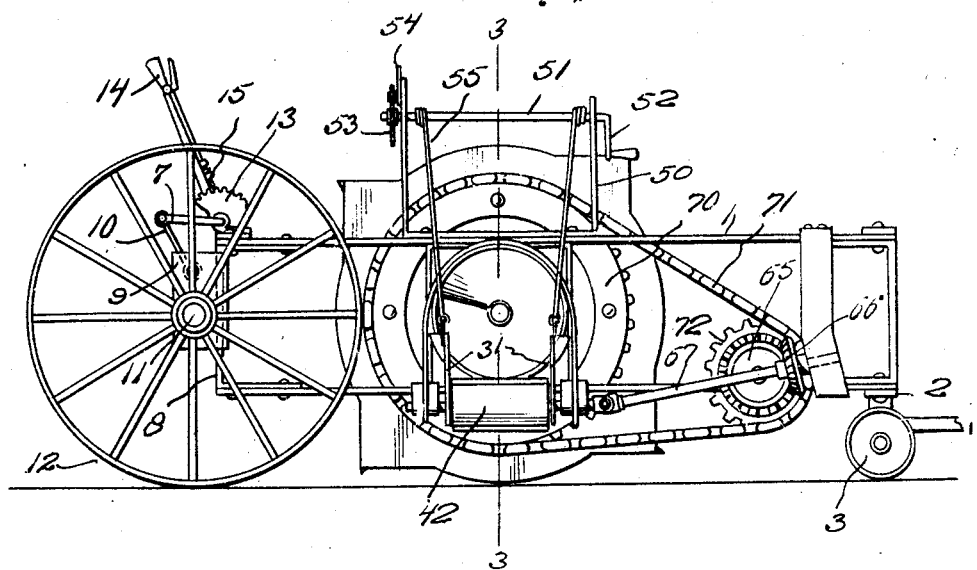
Figure 2 is a side elevation of the apparatus.

In the preferred embodiment of my invention all of the parts of the apparatus are constructed of metal. I would have it understood, however, that it is within the purview of my invention to make the different parts of the apparatus of any material or materials best suited to the functions of said parts.

Among other elements the apparatus comprises a main frame having spaced side portions 1. The forward portion of the said main frame is mounted on a pivotally connected axle 2, equipped with wheels 3, and adapted for the connection of draft animals with the apparatus. I would have it understood, however, in this connection that without affecting my invention in any respect, provision may be made for the propulsion of the apparatus either by the engine 4 shown in Figure 1 or by any other engine suitable to the purpose. A transverse rock shaft 5 is journaled in bearings fixed adjacent to the rear end of the main frame, and is provided at its ends with crank arms 7. The main frame is provided with rear uprights 8, Figures 1, 2 and 5, and straddling the said uprights 8 are U-shaped members 9 with which the said arms 7 of the shaft 5 are connected by links 10. The axle 11 of the rear wheels 12 of the apparatus is journaled in the said members 9, and hence it will be manifest that when the shaft 5 on the rear portion of the main frame is rocked in one direction, the main frame will be raised, while when said shaft 5 is rocked in the opposite direction the main frame will be lowered. For the convenient adjusting and adjustable fixing of the rock shaft 5, I provide a segmental rack 13 fixed on the main frame, and a hand lever 14 fixed with respect to the rock shaft 5 and equipped with a detent 15 for cooperation with the said segmental rack.

In the preferred embodiment of my invention, the arms 7 of the shaft 5 are connected together by a transverse rod 16, and the before mentioned links 10 are connected directly to said rod 16.

Figure 3:
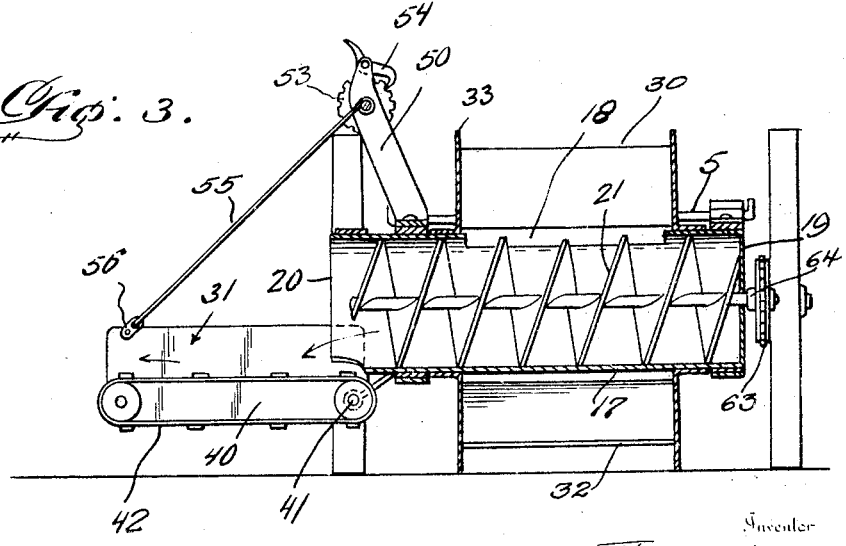
Figure 3 is a vertical transverse section, taken in the plane indicated by the line 3—3 of Figure 2, looking rearwardly.

Arranged transversely in the main frame of the apparatus and fixed in approved manner with respect to the said frame is a cylindrical conductor 17 open at its upper side as indicated by 18, Figures 1, 3 and 4. One end of the transverse conduit 17 is closed as indicated by 19, and the opposite end portion of the said conduit is extended laterally outward beyond the adjacent frame 1 and is open as designated by 20. Arranged and adapted to rotate about its axis in the conduit 17 is a screw conveyer 21, the said conveyer 21 having for its function to feed dirt to and through the open end 20 of the conduit 17.

In addition to the essential elements thus far enumerated, my novel apparatus comprises a rotary lifter 30, and a lateral carrier 31. The said lifter is designed more especially for use in grading operations, and as its name imports it is adapted to raise dirt from the ground; the dirt raising function being performed by scoops 32 of which there may be any desired number according to the size of the rotary lifter. The said scoops 32 are preferably shaped as shown best in Figure 4, and consequently it will be apparent that with the lifter 30 appropriately mounted for rotation about the transverse conduit 17, the scoops 32 between spaced heads 33 comprised in the rotary lifter, will operate to take dirt from the ground and incident to such operation will accomplish a grading function, and then will lift or elevate the dirt and discharge the same to the transverse conduit 17 through the opening 18 thereof.

As will be understood from Figures 1, 2 and 3, the lateral carrier before referred to, is preferably made up of frame sides 40 spaced apart and pivotally connected at 41 to the main frame, and an endless apron 42 disposed and movable between the said frame sides 40. The upper stretch of the apron 42 is so relatively arranged as to receive dirt from the open end 20 of the transverse conduit 17 irrespective of whether the carrier 31 is in horizontal position as shown in Figure 3 or is in inclined position as for the delivery of dirt to a wagon positioned alongside the novel apparatus. Standards 50 are fixed to and rise from one side of the main frame of the apparatus, and in said standards is journaled a shaft 51 having a crank 52 and also having a toothed wheel 53, the latter for cooperation with a dog 54. Cables 55 are connected to and adapted to be wound upon the shaft 51, and said cables are connected at 56 to the outer portion of the frame sides of the carrier 31. From this provision it follows that the lateral carrier 31 may be conveniently and quickly raised and lowered, and may be adjustably maintained in a horizontal position or in various inclined positions as occasion requires.

By preference the engine 4 is employed for the operation of the screw conveyer 21, the rotary lifter 30 and the endless apron 42 of the carrier 31. Toward the said end the crank shaft 60 of the engine 4 is connected by sprocket gearing 61 with a transverse shaft 62 carried by the main frame. One end of the said shaft 62 is connected by sprocket gearing 63 to the shaft portion 64 on the conveyer 21 for the rotation of the latter about its axis. The opposite end of the shaft 62 is provided with a miter gear 65, in mesh with a miter gear 66 on a longitudinal inclined shaft 67, the said shaft 67 being appropriately connected to the shaft 41 on which the frame sides of the carrier 31 are swingable as before described. The shaft 41 is equipped with a roller for the transmission of motion to the endless apron 42 and hence it will be manifest that movement of the apron 42 will attend rotation of the engine shaft 60. A large sprocket gear 70 is fixed with respect to one end of the rotary lifter 30, and said gear 70 is connected to a sprocket belt 71 with a sprocket gear 72 on the shaft 62, and hence when the engine shaft 60 and the shaft 62 are rotated, the lifter 30 will also be rotated for the performance of the function ascribed to said lifter when the main frame is lowered to put the lifter in working position.

In the practical operation of my improved apparatus, the apparatus is moved forwardly at a proper rate of speed, and so that the correctly positioned lifter 30 will raise a load of dirt evenly, and leave the surface acted upon by the lifter smooth and level. Manifestly my novel apparatus has the capacity of lifting dirt from a road and discharging the dirt to one side of the road, or to lift dirt from the side of the road and discharge it on the road, or to lift the dirt from any desired point and discharge the dirt into trucks or wagons placed in succession alongside the apparatus, the dirt in that case being hauled to a suitable point of discharge.

Manifestly by adjustment of the lever 14 and adjustable fixing thereof, the rotary lifter 30 may be nicely adjusted relative to the surface to be operated upon.

One of the important features of my invention is the compactness of the apparatus when the capacity of function of the apparatus is considered, the rotary lifter 30, the screw conveyer 21, and the lateral carrier 31 being all arranged and adapted to operate in a line which renders it feasible to make the apparatus quite short, and thereby renders the apparatus much more inexpensive than would otherwise be the case.

I have specifically described the construction and relative arrangement of the parts embraced in the present and preferred embodiment of my invention in order to impart an exact understanding of said embodiment in all of its details. I do not desire, however, to be understood as confining myself to the specific construction and arrangement of parts as disclosed, my invention residing in the structure defined by my appended claims, and within the scope of said claims various changes and modifications may be made without departure from my invention. For instance while I prefer to employ the screw conveyer 21 relatively arranged as shown and described, I desire it distinctly understood that in the relation in which the screw conveyer 21 is employed any other appropriate type of conveyer may be used without affecting my invention as claimed.

Having described my invention, what I claim and desire to secure by Letters-Patent, is:—

1. In an apparatus for lifting and handling dirt, the combination of a main frame appropriately supported at one end, rear wheels, means for adjusting and adjustably fixing the rear portion of the frame relative to said wheels, and ground lifting and handling means carried by the said frame; the said wheels being carried by an axle, and the said axle being mounted in vertically movable parallel members guided at the end of the frame, and the said vertically movable members being connected with a lever associated with means for adjustably fixing the same.

2. An earth lifting and handling apparatus comprising a frame, said frame adjustable vertically relative to the ground, means for adjustably fixing the frame, a transverse conduit carried in the frame and having an opening in its top and also having an open end, said end extending laterally outward beyond the frame, a rotary lifter movable about said transverse conduit, and having shovels adapted to raise dirt and discharge the same through the opening in the top of the conduit, a screw conveyer in said conduit, and a vertically swingable lateral carrier connected with the frame and arranged to receive dirt from the open end of the conduit and deliver the dirt at one side of the apparatus.

3. In an apparatus for lifting and handling dirt, the combination of a main frame appropriately supported at one end and having adjacent to its opposite end uprights, an axle equipped with ground wheels, U-shaped members straddling and movable vertically on the said uprights and receiving and carrying said axle, a shaft mounted on the main frame and having cranks connected with said U-shaped members, a lever fixed to said shaft, means whereby said lever may be adjustably fixed, and ground lifting and handling means carried by the main frame.

4. In an apparatus for operating on and handling dirt, the combination of a main frame, means for supporting opposite end portions of said frame in spaced relation to the ground, a transverse tubular conduit arranged in the main frame at an intermediate point in the length thereof and closed at one end and open at its opposite end and having an opening in its top, a conveyor in said tubular conduit for moving dirt toward the open end thereof, a rotary lifter mounted on and turnable about the said tubular conduit at opposite ends of the opening in the top of said conduit, with a conveyor carried by and extending laterally from the main frame and having its receiving portion disposed under the discharge end of said tubular conduit.

In testimony whereof I affix my signature.

WALTER SEAMAN.